United States Patent [19]
Norbury, Jr. et al.

[11] Patent Number: 5,575,715
[45] Date of Patent: Nov. 19, 1996

[54] BALL LOUVER WITH LINER ASSEMBLY

[75] Inventors: Raymond L. Norbury, Jr., Dallas; Roger H. Simonsen, Sachse, both of Tex.

[73] Assignee: Cary Products Co., Inc., Hutchins, Tex.

[21] Appl. No.: 418,365

[22] Filed: Apr. 7, 1995

[51] Int. Cl.$^6$ .................................................. F24F 13/065
[52] U.S. Cl. .................................................. 454/286
[58] Field of Search ............................ 454/76, 156, 286

[56] References Cited

U.S. PATENT DOCUMENTS 3,988,973  11/1976  Honmann .............................. 454/286
5,399,119   3/1995  Birk et al. ............................. 454/76

FOREIGN PATENT DOCUMENTS 2519846  11/1976  Germany .............................. 454/154

*Primary Examiner*—Harold Joyce
*Attorney, Agent, or Firm*—T. D. Copeland; David W. Quimby

[57] ABSTRACT

A ball louver assembly for controlling the direction of pressurized air passing through the openings of a ball shaped louver. The ball louver mechanism comprises a ball louver liner, which holds the ball louver and liner inside and between front and rear retainer rings. An inner ring attached to the back edge of the front retainer ring allows the ball louver with its attached liner to be turned in any rotational direction to direct the forced air as desired. The structure of the ball louver and the liner allows the ball louver to be turned into a position to close, reduce or select the direction of the pressurized air leaving the air conditioner through the openings in the ball louver body. This structure is similar to basic gyroscope axis principles in its mobility of the ball louver in any direction by incorporating a new liner with or without spring-like compression effects and/or with or without notch-bump presence to help hold the ball louver in the last desired position without vibration or forced air being able to cause movement of the ball louver from its last desired set position. Another feature in the liner gives compression spring-like increased coefficient of friction to the axle of the rotational ball louver to hold in the desired set position.

20 Claims, 2 Drawing Sheets

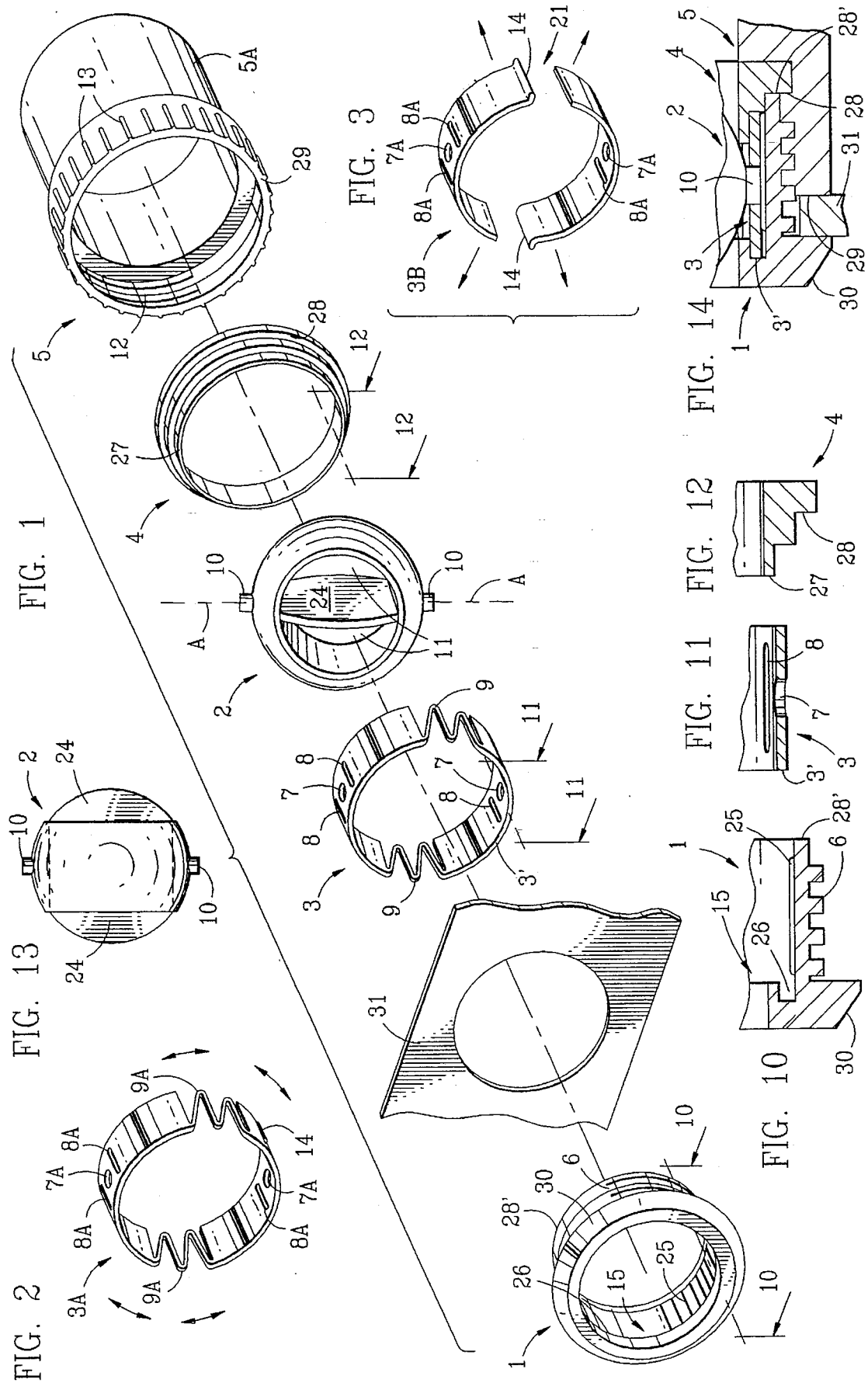

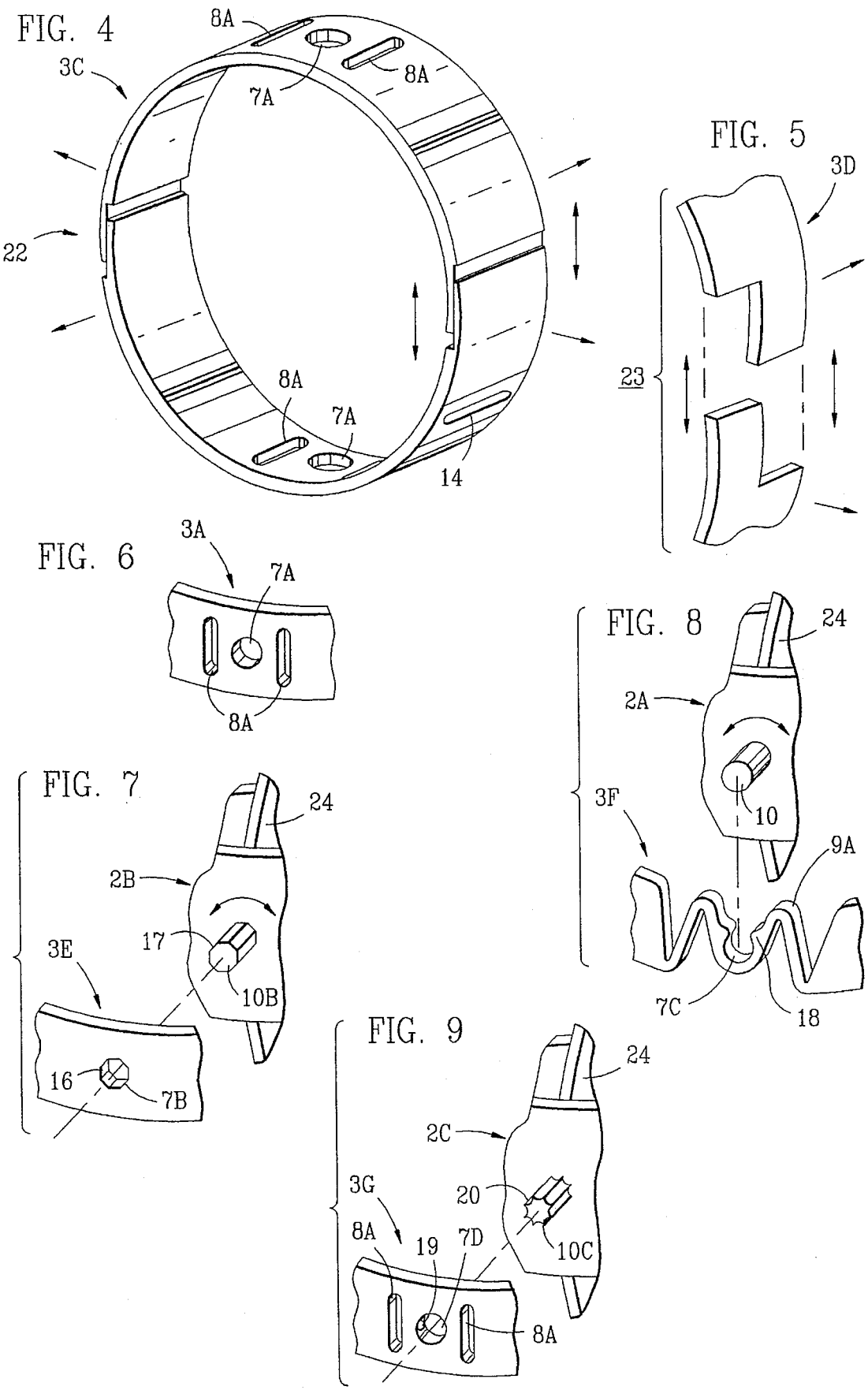

BALL LOUVER WITH LINER ASSEMBLY

BACKGROUND OF THE INVENTION

1. Field of Use

This invention will be used primarily in vehicular air conditioning units, and in other applications where it is imperative that the air directing louver will maintain the position at which the user has set it.

2. Prior Art

There are numerous prior art air conditioning units that employ a ball louver for directing the air flow therethrough, but none are believed to utilize the inventive concepts as employed in the louver assembly of this invention.

SUMMARY OF THE INVENTION

A principal object of this invention is to provide an apparatus for adjusting the direction of the air flow passing through an air conditioning unit in such a manner that, once adjusted, the setting will be maintained until deliberately further adjusted by the user.

Another object is to provide an adjustable louver for an automotive air conditioning unit that will not be thrown out of adjustment by the surges and vibration present in such use.

A further object is to provide a ball-type louver for directing the conditioned air that is extremely easy to be adjusted for air flow direction, and yet maintains its adjustment under normal operating conditions.

Still another object is to provide a unique liner ring for a ball louver assembly that permits the ball louver and its retainer assembly to maintain the required amount of friction between them, without the requirement of expensive extremely close tolerances.

An additional object is to provide a ball louver assembly that not only directs the air precisely and continuously where it is desired, but also prevents the loss of air and leakage where an air flow is not desired.

Yet another object is to provide a ball louver which is able to substantially shut off air flow by manual movement of its vane.

These and other objects will become apparent from a perusal of the specification, claims and the drawing that follows.

BRIEF DESCRIPTION OF THE DRAWINGS

FIG. 1 is an exploded view of the ball louver assembly.

FIG. 2 is an enlarged detail view of the liner of FIG. 1;

FIG. 3 is a detail view of another embodiment of this liner;

FIGS. 4 & 5 are detail views of other embodiments of liners for the ball louver assembly of FIG. 1;

FIG. 6 is an enlarged detail view of the axle receiving hole of the liner of FIGS. 1–5;

FIG. 7 is a detail view of the matching axle/hole of another embodiment of the liner and ball of this invention;

FIGS. 8 & 9 are detail views of other matching axle/hole combinations which are employed in other embodiments of this invention;

FIGS. 10–12 are sections taken at 10—10; 11—11 & 12—12 of FIG. 1;

FIG. 13 is a side elevational view of the ball louver of FIG. 1, showing vane tips extending beyond the ball opening for manual movement;

FIG. 14 is a sectional view of the assembly of the parts of FIGS. 10–12.

DESCRIPTION OF THE PREFERRED EMBODIMENT(S)

It will be observed in FIG. 1, that the complete ball louver assembly of this invention comprises a front retainer ring 1, followed in exploded view fashion, by a liner, or liner ring 3, and a ball body 2, and an inner ring 4, and a rear retainer ring 5, which upon assembly threadedly joins the front retainer ring 1 to make the complete ball louver assembly of this invention.

The liner, also called liner ring, is indicated generically as 3, in FIG. 1, while each of the specific embodiments of this liner are identified as 3A through 3G. A conventional liner ring would comprise a one piece ring shaped structure that would engage the ball body by the engagement of circular axle holes in aligned locations in the liner ring, with axles projecting from aligned locations on the exterior surface of the ball body.

In the instant invention, each of the liner embodiments 3 is adapted to exert a binding force on the axles 10 of the ball body 2 and on the front retainer ring 1 to require that a certain amount of manual force is required to change the position of the air vane 24 (and hence the direction of the air flow), once the user has manually set the desired air flow direction, into the assembly. Vane 24 provides two air sections 11 in normal operations, but will close off the air flow when turned cross wise to the air flow.

The exploded components of FIG. 1 are assembled by placing the liner 3 over the ball body 2 in a manner that axle holes 7 in liner 3 moveably, but tightly engage the axles 10 of body 2, and inserting both units together onto the inner surface 15 of retainer ring 1, after which the surface 28 of an inner ring 4 is welded, glued or mechanically fastened to the back edge 28' of the front retainer ring 1 to encase and hold ball louver body 2; after which the rear retainer ring 5 through its inner threads 12 engages the outer threads 6 of front retainer ring 1 to complete this assembly.

The ball louver assembly of FIG. 1 may be used in vehicular applications, in which case the bezel 30 of the front retainer ring 1 will bind against the dash or mounting panel 31 to hold the ball louver assembly in place when the front edge 29 of the rear retainer ring 5 is threadedly tightened onto the threads 6 of front retainer ring 1, and abuts panel 31 from the back side thereof. A flexible hose (not shown) may be attached to the rear extension 5A of rear retainer ring 5, for this or other applications. Rear retainer ribs 13 assist in the manual assembly of rear retainer ring 5 onto front retainer ring 1.

The projecting front end of vane 24 may be manually rotated or pivoted to cause the ball louver body 2 to move in gyroscopic fashion to determine the direction of air passages 11 through this ball louver assembly, and even to substantially shut off the air flow entirely, when vane 24 is perpendicular to the direction of air flow through the ball louver 2.

FIG. 2 shows a specific liner identified as 3A, whereas when used in the exploded assembly view of FIG. 1, the liner was referenced generically as 3, indicating that any of the specific embodiments of this liner, viz 3A–3G, could be used in such an assembly. Similarly the modifications to the axle 10, 10B & 10C, and the modifications to the axle holes 7A–7D, could be employed where desired. The axle hole 7A is slightly smaller than its corresponding axle 10, so that upon insertion of the axle 10 into the smaller hole 7A in the elastomer material of the liner 3A, the opening 7A will spread and put pressure onto material between slots 8A and hole 7A and on both sides of hole 7A, so that the material will place a physical drag on the axle 10, such that it will resist accidental and vibration caused movement. The liner 3A of FIG. 2 is seen to have two zig-zag sections 9A which may compress or expand as required to assure that liner 3A will provide pressure against the inner surface 15 of front retainer ring 1, and when assembled liner 3A will also provide a drag to deter accidental movement of the liner 3A and its retained ball louver body 2.

Once the ball louver body 2 and liner 3 are snugly positioned within the front retainer ring 1, the inner ring 4 is attached to the front retainer ring 1 by any known means, including a solvent to bind the plastic material of each together and secure the retention of body 2 and liner 3 in a firm but slideable relation within front retainer ring 1; at which position the body 2 and liner 3 have 360° rotation within the ring 1, and the vane 24 and body 2 have 360° movement within the liner 3 and retainer ring 1, upon the application of finger force to overcome the intentional resistance to movement these members all include. The liner springs 9 perform a spring effect when the hole 7 is compressed over and down onto the axles 10, and liner 3 and body 2 inserted together in retainer ring 1. When released inside ring 1, the compressed liner spring 9 expands the liner 3 up against the front retainer ring inside surface 15 to induce friction to help hold ball body 2 in a set position. The liner spring action also accommodates for differences in tolerances in the liner outside diameter and the inside surface (diameter) 15 of front retainer ring 1.

FIG. 3 shows a liner 3B that is made in two parts 21 with each part having a rib 14 added to the liner at the parting line. This liner rib 14 can be added to other liners as shown in FIGS. 2 & 4, and is useful in further holding the ball body 2 and liner 3 in a set or fixed position in relation to the front retainer ring inside surface 15, which may itself have corresponding ribs 25 to further hold the liner 3 and consequently, the ball louver body 2 in the desired set position.

FIG. 4 shows a liner 3C with a split liner lap joint 22, where each half of the liner may expand or contract without leaving an open area through which air may escape during operation.

FIG. 5 shows an offset split liner joint 23 that may be used for a similar purpose as the lap joint 22 of FIG. 4.

The split liner construction of 3B in FIG. 3 comprises two symmetrical and radial halves 21 and offers a lower cost in tooling a mold for these halves molded out of an elastomer spring-like plastic material. The curved split liners are bent further down around the ball louver body 2 onto each ball louver axle 10 and held there while inserting both the split liner halves with the ball louver into the front retainer ring 1. The release of both split liner halves 21 causes the liner halves to spring back outward in contact with front retainer ring inside diameter surface 15 to induce friction to hold liner 3 with louver body 2 from rotating in either direction from vibration and/or forced air to a different position from the one manually set by the user. To further aid in preventing liner's halves and louver body 2 from accidentally moving from the last set position, the liner halves may include a rib 14 to mate with ribs or bumps 25 inside the front retainer ring inner surface 15.

The inside groove 26 of front retainer ring bezel 30 is used to help guide the liner 3 around the louver body 2 while the liner is under a compression spring-like action. The bezel groove 26 allows the circular edge of the liners 3–3G to slide and rotate therein. Likewise, the inside surface 27 of the inner ring 4 is used to further assist liner 3 edge around ball louver 2 to create a similar groove like 26 and to support at the rear of the liner ring 3.

FIG. 6 is an enlarged portrayal of the relation between the hole 7A and slots 8A of the liner 3A and hole 7, slots 8 of liner 3 and others. As the hole 7A is enlarged by the insertion of an axle 10, larger than the hole 7A, the material between hole 7A and both slots 8A is partly compressed and partly moves into and distorts the slots 8A, whereupon the axle 10 is held in place under pressure in hole 7A. This compression prevents rotation of ball louver 2 and its axle 10, except when deliberately moved, as by manual force applied to vane 24, as indicated by the arrows in FIGS. 7 and 8.

The axle 10B of FIG. 7 includes a plurality of flats 17 to match with the series of flats 16 of the liner 3E, so that the rotation of ball louver 2B may be done manually in short stages and wherein the movement of each stage must overcome the intentionally inserted friction and expansion of liner 3E elastomer material to move from one flat to the next, due to the tightness of the fit between axle 17 and hole 16.

The axle 10 of ball louver 2A of FIG. 8 is circular as is the axle 10 of FIG. 1, but the liner 3F of this combination includes a special partial hole 7C that includes a notch 18 in the flexible material zig-zag spring portion 9A. The insertion of axle 10 into partial hole 7C forces the notches 18 to expand to admit axle 10, and the contact to apply pressure to axle 10 and apply a friction drag thereto when vane 24 is manually moved to rotate the ball louver 2 in the direction of the arrow of FIG. 8. This frictional drag also prevents accidental and/or undesired rotation of axle 10 and louver 2, such as might be caused by vibration or jolts that might be experienced by an air conditioning unit installed in a vehicle.

In FIG. 9, a different technique is employed to create the frictional drag in the controlled turning of ball louver 2C in liner 3G. In this embodiment the axle 10C includes a plurality of notches 20 to engage bump 19 in the axle hole 7D. The slots 8A will permit the elastomer material between the slots 8A and hole 7D to expand into the slots, but still maintain the desired resistance to the rotation of ball louver 2C.

FIGS. 10, 11, & 12 show the sequential alignment of the front retainer ring 1, and the liner 3 that is to be inserted therein in such a manner that its forward edge 3' will engage circular groove 26, while the outer circular surface 27 engages the inner diameter surface of liner 3 and the wall 28 of inner ring 4 is glued or otherwise attached to front retainer ring 1 and surface 28'. FIG. 14 is a section showing the final assembly of the elements of FIGS. 1 and 10–12.

In summary, the ball louver assembly of this invention is economical to manufacture, and very effectively fulfills the objects of this invention, by providing a unique liner made of a plastic membrane material, wherein the end result is an assembly having a convenient accessible air directing control mechanism that will remain in the direction set until deliberately moved by human touch, even when installed in vehicle applications where vibration and jolts are present, and even under a strong forced air circulation passing through the louver assembly.

The foregoing description and disclosure are representative of the concept of this invention, which may be practiced in many ways without departing from the scope and spirit of the invention; and the devices and methods shown herein may be accomplished in many ways within the scope of the appended claims.

What is claimed is:

1. A ball louver air directing assembly, comprising:
   a. ball louver body having a central opening suited for air passage therethrough,
   b. a pair of aligned axles projecting outwardly from said body,
   c. a liner comprising a selectively continuous and non-continuous style ring having diametrically aligned axle holes extending axially through said liner and being in alignment with and engaging said axles,
   d. a front retainer ring having a threaded outer surface and an inner surface to receive said liner in close fitting but manually turnable relation,
   e. means in said liner to determine the resistance to be overcome to rotate said ball body by manual application of force.
   f. a rear retainer ring having a threaded inner surface to thread onto the front retainer ring, and
   g. an inner ring adjoining the rear retainer ring to receive said liner in close fitting but manually turnable relation.

2. A ball louver air directing assembly, as in claim 1, wherein all components therein are of plastic material.

3. A ball louver assembly, as in claim 1, wherein said liner is made of an elastomer spring-like plastic material.

4. A ball louver assembly, as in claim 1, comprising a vane located in said central opening dividing said opening into a plurality of compartments and extending beyond said central opening and beyond said front retainer ring.

5. A ball louver assembly, as in claim 4, wherein said application of force is applied to said vane for air direction and to substantially shut off air flow through the assembly.

6. A ball louver assembly, as in claim 5, wherein said application of force is applied to that portion of said vane projecting beyond said front retainer ring.

7. A ball louver assembly, as in claim 1, wherein liner includes means to cause said axles to resist accidental and untouched rotation and maintain said ball louver body in its preset position.

8. A ball louver assembly, as in claim 1, wherein said means comprises at least one slot adjacent said axle hole in said liner.

9. A ball louver assembly, as in claim 1, wherein said liner is of a flexible membrane material.

10. A ball louver assembly, as in claim 1, wherein said liner includes at least one section of compressible material to cause said liner to press against the inner surface of said front retainer ring.

11. A ball louver assembly, as in claim 1, wherein said liner includes interruptions within its axle holes to bind against said ball louver body axle to resist unwanted rotation of said body within said assembly.

12. A ball louver assembly, as in claim 1, wherein said liner is of elastomer material and includes axle holes with irregularities so dimensioned as to bind against said axles and prevent said louver ball body from inadvertently moving from its preset position due to vibration of said louver assembly.

13. A ball louver assembly, as in claim 6, wherein said liner includes snap-in sockets to receive said axles and apply drag to said axles to prevent accidental rotation of said axles in said sockets.

14. A ball louver assembly, as in claim 1, wherein said liner comprises separate parts that are joined by lap joints to reduce air leakage when said louver assembly is functioning in an air treating operation.

15. A ball louver assembly, as in claim 1, wherein said liner comprises separate parts that are joined by offset joints to reduce air leakage when said louver assembly is functioning in an air treating operation.

16. A ball louver assembly, as in claim 1, wherein said liner may include one or more serrations on its outer surface and said front retainer ring includes one or more serrations on its inner surface, to prevent said ball louver body from accidentally moving from its preset position.

17. A ball louver assembly, as in claim 1, wherein said liner is compressible and expandable to accommodate a tight fit between the liner and the front retainer ring, and between the liner and the inner ring, upon installation in said ball louver assembly.

18. A ball louver assembly, as in claim 17, wherein said liner includes axle holes that are smaller than and in alignment with said axles, and wherein said axle holes are adjacent one or more slots which permit the liner material to expand when said axle is forced into its aligned liner hole, whereby in the assembly said ball body and its axle may be rotated in said axle hole under manual pressure, but may not be moved accidentally during normal operation.

19. A ball louver assembly, as in claim 1, wherein said rear retainer ring includes a rearwardly extending projection for reception of a flexible hose, and wherein said rear retainer ring includes ribs to assist in tightening said rear retainer ring onto said front retainer ring.

20. A method of making a ball louver assembly for an automotive air conditioner, comprising, in combination, the steps of:
   a. creating a ball body having an opening therethrough for air passage,
   b. creating a vane in said ball body to divide said air passage, and projecting said vane beyond the ball body,
   c. snapping a liner ring having two axle holes onto axles on said ball body,
   d. placing said liner and body into a cavity in a front retainer ring in such a manner as to require manual force on the exposed end of said vane and ball body to turn said louver body and said liner ring,
   e. an inner ring for securing said ball louver and liner ring inside said front retainer ring,
   f. and threading a rear retainer ring into said front retainer ring to complete said ball louver assembly.

* * * * *